United States Patent
Ferrar

(10) Patent No.: US 11,733,677 B2
(45) Date of Patent: Aug. 22, 2023

(54) METHOD OF MANUFACTURE AND PREDICTING POWDER DEGREDATION IN AN ADDITIVE MANUFACTURING PROCESS

(71) Applicant: LPW Technology Ltd, Widnes (GB)

(72) Inventor: Ben Ferrar, Stoke on Trent (GB)

(73) Assignee: LPW Technology Ltd., Widnes (GB)

( * ) Notice: Subject to any disclaimer, the term of this patent is extended or adjusted under 35 U.S.C. 154(b) by 443 days.

(21) Appl. No.: 16/766,466

(22) PCT Filed: Nov. 23, 2018

(86) PCT No.: PCT/GB2018/053386
§ 371 (c)(1),
(2) Date: May 22, 2020

(87) PCT Pub. No.: WO2019/102203
PCT Pub. Date: May 31, 2019

(65) Prior Publication Data
US 2020/0376751 A1      Dec. 3, 2020

(30) Foreign Application Priority Data

Nov. 23, 2017  (GB) ...................................... 1719436
Jul. 9, 2018   (GB) ...................................... 1811226

(51) Int. Cl.
*B29C 64/153*       (2017.01)
*B29C 64/245*       (2017.01)
(Continued)

(52) U.S. Cl.
CPC ........ *G05B 19/4099* (2013.01); *B29C 64/153* (2017.08); *B29C 64/171* (2017.08);
(Continued)

(58) Field of Classification Search
None
See application file for complete search history.

(56) References Cited

U.S. PATENT DOCUMENTS

| | | |
|---|---|---|
| 5,304,329 A | 4/1994 | Dickens, Jr. et al. |
| 2014/0186205 A1 | 7/2014 | O'Neill |

(Continued)

FOREIGN PATENT DOCUMENTS

| | | |
|---|---|---|
| EP | 2910324 A2 | 8/2015 |
| FR | 3029829 B1 | 6/2016 |

(Continued)

OTHER PUBLICATIONS

L.C. Ardila et al., "Effect of IN718 recycled powder reuse on properties of parts manufactured by means of Selective Laser Melting," Science Direct, Physics Procedia 56 (2014) 99-107.

*Primary Examiner* — Anthony M Liang
(74) *Attorney, Agent, or Firm* — Gerald T. Gray; Leydig, Voit & Mayer, Ltd.

(57) ABSTRACT

A method of additive manufacture involves building a container 8 and a structure by fusing powder 12, 13, 14, such that the container contains the structure and unfused powder. The container 8 may be used in a method for predicting powder degradation in an additive manufacturing process. Containers containing different types of structure may be built to measure the effect of building different types of structures on powder degradation. A structure to be built may be characterised by classes of structural features it contains and information obtained used from building containers used to predict how building the structure will degrade powder.

18 Claims, 6 Drawing Sheets

(51) Int. Cl.
  *B29C 64/393* (2017.01)
  *B29C 64/171* (2017.01)
  *G05B 19/4099* (2006.01)
  *B33Y 40/00* (2020.01)
  *B33Y 10/00* (2015.01)
  *B33Y 50/02* (2015.01)
  *B33Y 80/00* (2015.01)
  *B29L 31/00* (2006.01)
  *B22F 10/73* (2021.01)
  *B22F 10/28* (2021.01)
  *B22F 12/67* (2021.01)
  *B22F 10/39* (2021.01)
  *B22F 10/85* (2021.01)

(52) U.S. Cl.
  CPC .......... *B29C 64/245* (2017.08); *B29C 64/393* (2017.08); *B33Y 40/00* (2014.12); *B22F 10/28* (2021.01); *B22F 10/39* (2021.01); *B22F 10/73* (2021.01); *B22F 10/85* (2021.01); *B22F 12/67* (2021.01); *B29L 2031/7174* (2013.01); *B33Y 10/00* (2014.12); *B33Y 50/02* (2014.12); *B33Y 80/00* (2014.12)

(56) References Cited

U.S. PATENT DOCUMENTS

| | | | |
|---|---|---|---|
| 2015/0283614 A1* | 10/2015 | Wu | B22F 10/38 |
| | | | 419/68 |
| 2016/0054205 A1 | 2/2016 | O'Neill | |
| 2017/0121039 A1* | 5/2017 | Ciesiun | B29C 64/182 |
| 2018/0071821 A1 | 3/2018 | Crear et al. | |

FOREIGN PATENT DOCUMENTS

| | | |
|---|---|---|
| WO | WO 2014/165334 A1 | 10/2014 |
| WO | WO 2017/060600 A1 | 4/2017 |
| WO | WO 2018/087464 A1 | 5/2018 |

* cited by examiner

Section A-A

Section B-B

Section B-B

Section A-A

Section B-B

METHOD OF MANUFACTURE AND PREDICTING POWDER DEGREDATION IN AN ADDITIVE MANUFACTURING PROCESS

CROSS REFERENCES

This Application claims priority to International Application No. PCT/GB2018/053386 by Ferrar entitled, "METHOD OF MANUFACTURE AND PREDICTING POWDER DEGRADATION IN AN ADDITIVE MANUFACTURING PROCESS," filed Nov. 23, 2018, and United Kingdom Application No. 1719436.6, by Ferrar entitled "PREDICTING POWDER DEGRADATION IN AN ADDITIVE MANUFACTURING PROCESS," filed Nov. 23, 2017, and United Kingdom Application No. 1811226.8, by Ferrar entitled, "METHOD OF MANUFACTURE USING AN ADDITIVE MANUFACTURING PROCESS," filed Jul. 9, 2018. All applications are incorporated in their entirety herein by reference.

TECHNICAL FIELD OF THE INVENTION

The present invention relates to a method of manufacture using an additive manufacturing process to build a container. The container may be used for predicting powder degradation in an additive manufacturing (AM) process. The present invention also relates to a method of predicting powder degradation in an additive manufacturing process.

BACKGROUND TO THE INVENTION

In a known AM process an AM machine produces articles from a powdered material, such as a metal or alloy. The machine deposits a layer of powder on a build platform and the powder is subsequently selectively fused or otherwise solidified, typically with a laser or electron beam, to form an article or articles. The process is repeated so that articles are formed layer by layer.

On completion of a build, unfused powder may be re-used in another build.

During a build operation unfused powder is subject to degradation. A metal powder may gradually oxidise, for example, which alters its properties and thus those of an article produced from the powder. The tendency of a powder to oxidise typically increases with temperature, and exposure to temperature may also affect other powder properties. Consequently, the nearer unfused powder is to an article being built or heat zone the more likely it is to suffer degradation.

Also, when powder is fused the process may cause some heated granules of powder to be scattered from the powder bed around the manufactured article, degrading the quality of the bulk, unfused powder around the article.

To ensure adequate build quality of an article it is usual to stop recycling powder when it has been degraded to a certain extent. This can be determined by analysing the powder, such as by making a bulk oxygen content measurement to determine the extent of oxidation of the powder, or just by limiting the number of times a batch of powder is recycled.

It is an object of embodiments of the present invention to predict how a powder will be degraded by a build operation. This will enable optimum use of powder to be made, and may also enable build operations to be designed in a way that minimises powder degradation.

SUMMARY OF THE INVENTION

According to a first aspect of the invention there is provided a method of manufacture comprising the step of causing an AM machine to build a container and a structure by fusing powder, such that the container contains the structure and unfused powder.

Building a container containing a structure and unfused powder enables the unfused powder to be subsequently analysed to determine how it was affected by building the structure. Given that the unfused powder immediately surrounds the structure it is the part of the overall unfused powder in the machine powder that will have been most affected by building the structure. The structure may be designed to include specific features of interest, such as particular classes of structural features.

The/each container may have any suitable form and could for example be formed by a sidewall constructed on the build platform of an AM machine surrounding the structure. The structure could thus also be built on the build platform. The side wall could be substantially circular or any other suitable closed shape. The side wall may be substantially vertical or may diverge or converge. The container may have an open top. In this case unfused powder removed from the container for analysis will need to be removed in a way that avoids it becoming mixed with any unfused powder surrounding the container and/or contained in other containers.

Alternatively the container may be closed and may form a capsule. In this case the method may involve breaking open the/or each container to remove unfused powder, this step may take place after removing the container from the build platform (which may be achieved without opening the container) and thus makes handling and avoiding contamination of unfused powder contained in the container more simple. The/or each container may comprise one or more sidewalls which diverge from each other as they rise from a base and subsequently converge towards one another towards a top and may have the form of two opposed cones or pyramids.

A line of weakness may be formed in the container at which the container will preferentially break when subjected to a force. The line of weakness may comprise a region of reduced wall thickness.

The/or each container may comprise a part shaped to be received by or connect to a tool or apparatus thereby to facilitate removing the container from a build plate and/or opening the container to release encapsulated powder. A respective part may be provided at each opposite end of the container. The/or each part may be shaped to connect with a spanner, screw driver, key or wrench.

The AM machine may be caused to build a plurality of containers during a single build, the plurality of containers comprising one or more type of container, each type of container comprising a different type of structure. The unfused powder from each container may then be analysed separately to determine the extent of degradation caused by the build process. This enables the effect on powder in building different types of structure to be measured. The extent of degradation of powder from at least some of the containers may then be used to predict powder degradation.

One or more parameters of each container may be substantially the same. The proportion of the internal volume of each container occupied by the structure may be substantially the same. The internal volume of each type of container may be substantially the same. This means that the melt ratio within each container may be the same, making valid comparison of unfused powder between different containers easier.

The structures in each container may be dominated by a class of structural features. One or more other parameters of different types of container may be substantially the same.

These features both help ensure that it is a change in a particular class of structural feature of interest that is having an effect on measured powder degradation as between each container.

Each container may contain structures having differing quantities of a class of structural features, this may be the same class of structural feature. This enables the effect of the quantity of a particular class of structural feature on powder degradation to be determined by comparing unfused powder from each container.

The structure in each container may be dominated by a different class of structural features. The structure in each of the different types of container may comprise substantially the same non-dominant amount of one or more other classes of any other structural feature present. Ideally, it is only the quantity of a particular class of structural feature of interest that varies between a particular group of different containers.

Multiple different such groups of containers may be built, each group enabling measurement of the effect of varying the quantity of a different class of structural feature.

In an embodiment the structures in two, three, four or more different types of container are respectively dominated by different classes of structural features. And there may be at least two, three, four or more containers with structures dominated by the same class of structural features.

The structures contained in different types of container may be dominated respectively by the following classes of structural features: thin sections; thick sections; and downwardly facing surfaces.

Thin sections may be thin wall structures.

Features having thin and thick sections may have substantially vertical sides.

Thin sections may be smaller than, and thick sections may be larger than, about ten times a beam width of the AM machine. For example, an AM machine may have a beam width of 70 μm, making the threshold between thin and thick sections 700 μm. Thin sections may be up to eight times, and thick sections may be at least twelve times, the beam width.

The structure in respective different types of containers may comprise or consist of one or more of: substantially vertical walls; substantially vertical rods; and a lattice structure.

The invention also provides a set of instructions for causing an AM machine to build a container or a plurality of containers according to the first aspect of the invention, with or without the optional features discussed above.

The invention also provides a method of predicting powder degradation in an AM process comprising the step of causing an AM machine to build a container or a plurality of containers having any of the features of the first aspect, with or without the optional features discussed above.

The method may comprise removing unfused powder from the/or each container.

Unfused powder may be analysed, such as by measuring its bulk oxygen content, to determine the extent of degradation of the powder caused by the build process.

The extent of degradation of powder caused by the build process may be used to obtain information relating to the rate of degradation caused by building structures comprising or consisting of classes of structural features and to derive a degradation rate associated with building one or more classes of structural feature.

The method may further comprise: characterising an article to be built in the other build process by determining the quantity (or relative quantity) of the classes of structural features for which a degradation rate has been obtained comprised in the article to be built; and applying the degradation rates to these quantities thereby to predict the extent of powder degradation that will be caused by building the article.

Two or more different articles to be built may be characterised so as to predict the relative powder degradation that will be caused by building the different articles.

The same article may be characterised in two or more different build orientations so as to predict the powder degradation that will be caused by building the article in the different orientations.

DETAILED DESCRIPTION OF THE INVENTION

In order that the invention may be more clearly understood one or more embodiments thereof will now be described, by way of example only, with reference to the accompanying drawings, of which:

Figure 1:
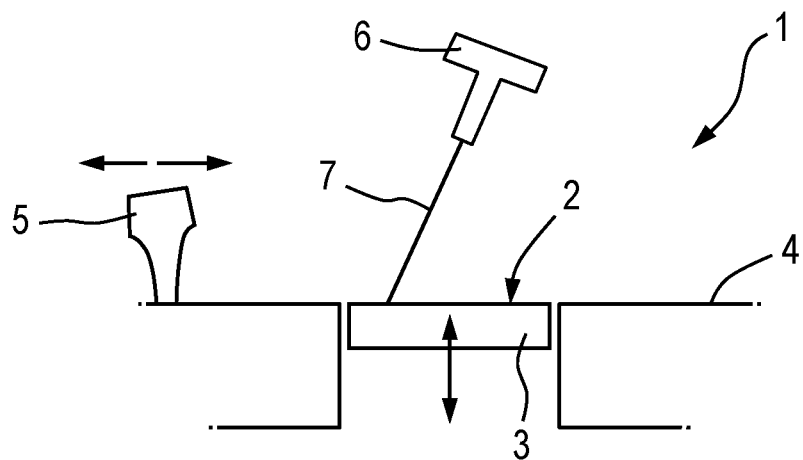
FIG. 1 is a schematic view of an AM machine.
Figure 2:
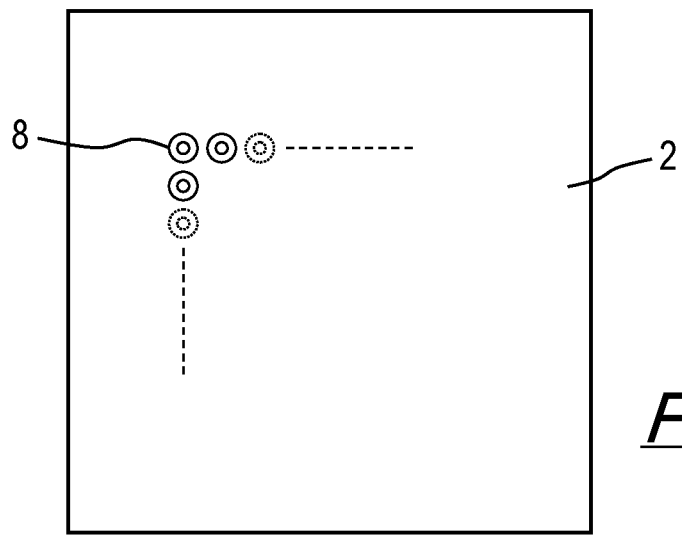
FIG. 2 is a plan view of the build platform of the machine of FIG. 1 showing an array of capsules formed by the machine.
Figure 3:
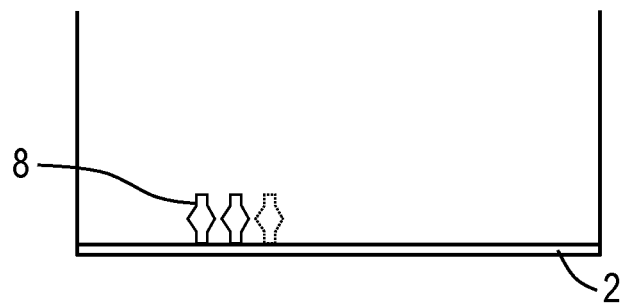
FIG. 3 is a side view of the build platform of FIG. 2.
Figure 4:
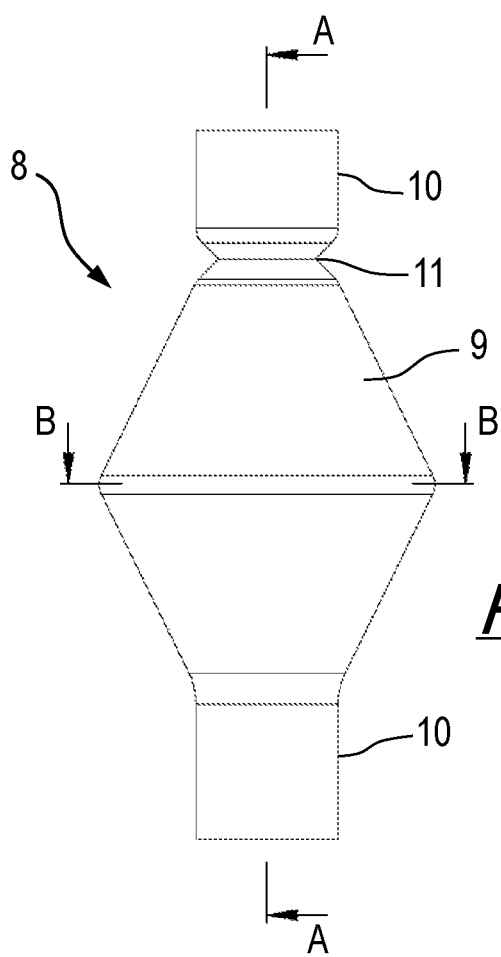
FIG. 4 is a side view of one of the capsules of FIG. 2.
Figure 5:
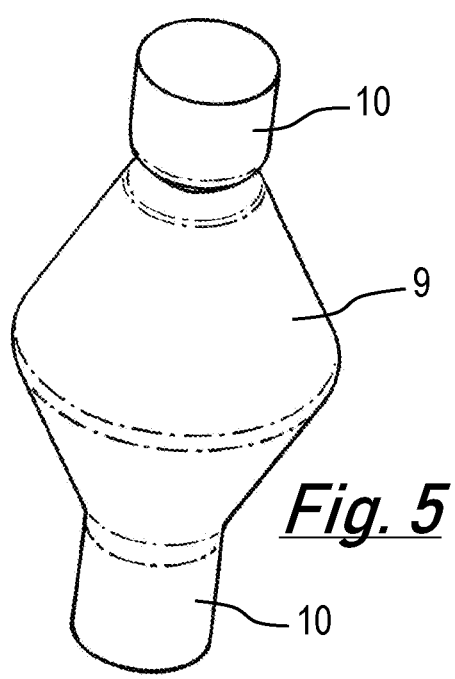
FIG. 5 is a perspective view of the capsule of FIG. 4.
Figure 6:
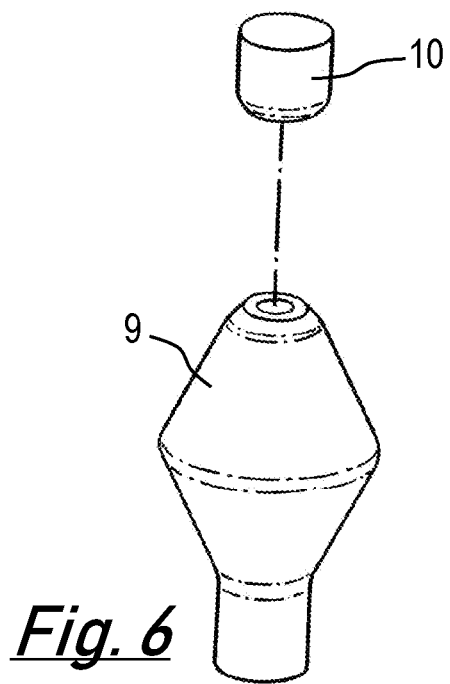
FIG. 6 is a perspective view of the capsule of FIG. 4 with one end of the capsule removed to enable powder inside the capsule to be removed.

Referring to the drawings, a conventional AM machine, generally 1, comprises a build platform 2 disposed on a moveable support 3 disposed in a recess in a surface 4 of the machine. A powder dispensing head and/or wiper blade 5 is arranged to move across and deposit a layer of powder (typically a metal powder) onto the build platform 2 to form a powder bed 14. A laser 6 is arranged to scan a beam 7 across the surface of the powder deposited on the build platform to selectively fuse the powder in a deposited layer to form an article to be built. Following the fusing step the moveable support is lowered slightly into the recess and the process repeated: a fresh layer of powder is deposited and selectively fused. The process is repeated to build up the article being built layer by layer until it is complete. Once complete the finished article is removed from the build platform 2 and machine 1 and unfused power can be re-used in another build process.

In order to be able to predict how a particular powder will degrade and how a particular build operation will cause powder used in the operation to degrade the AM machine is caused to build an array of containers in the form of capsules 8 of different types distributed across the build platform 2.

Each capsule has the general form of two, opposed, hollow cones (or frustrated cones) connected together at their bases. The cones form walls 9 of the capsule which define an enclosed space. This is a convenient structure to build in an AM machine as it is self-supporting. A structure is formed within the capsule, which determines the type of capsule. The space within the capsule not occupied by the structure contains unfused powder laid down during the build process, which becomes enclosed in the capsule.

At each end of the capsule there is formed a generally cylindrical head 10. Adjacent one of the heads 10 a line of weakness 11 is formed completely around the sidewall of the capsule by a thinning of the wall 9 to facilitate opening of the capsule. In use a tool is used to apply a torque to the head 10 adjacent the line of weakness 11 whilst the rest of the capsule is held still, for example with another tool at the opposite end of the capsule, or simply by virtue of the fact that the capsule 8 is formed on the build platform 2. This torque causes the capsule to preferentially break along the line of weakness 11.

Similarly, a tool may be used to apply a torque to the head 10 adjacent the build platform to break the capsule off the platform and to facilitate this the diameter of the head may decrease where it connects to the build platform.

One or both heads could be formed with features to facilitate use of a tool to apply a torque or other force to the head. For example, a head may have a hexagonal section, or just two or more opposed flat sides, to enable a spanner to engage with it.

The internal structure of each type of capsule comprises, and is preferably dominated by, one or more classes of structural features that may form part of an article to be built. In particular, the internal structure of one type of capsule may contain a greater amount of one or classes of structural features than any of the other types of capsule.

Figure 7:
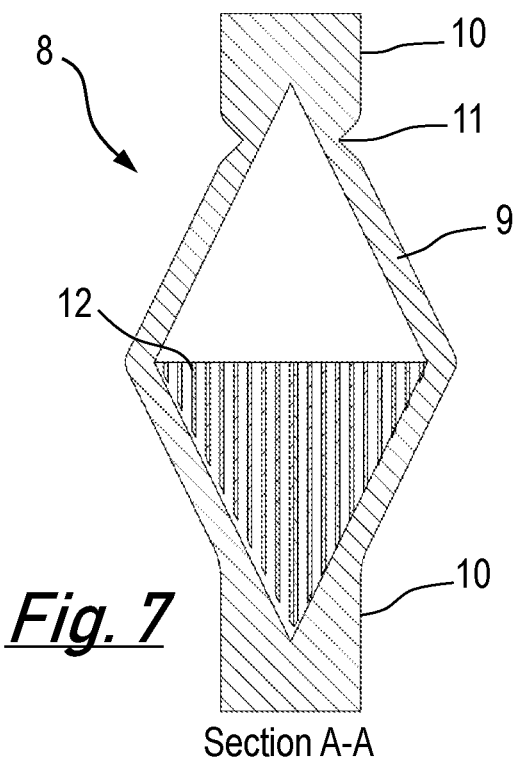
FIG. 7 is a sectional view of the capsule of FIG. 4 taken along the line A-A of FIG. 4.
Figure 8:
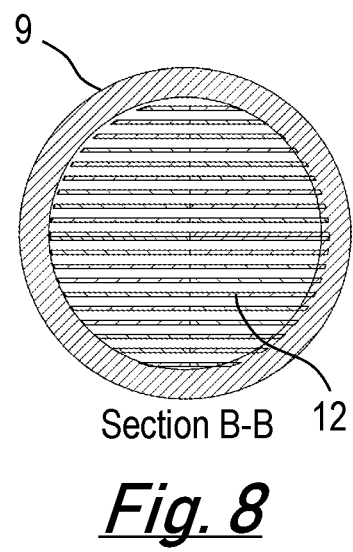
FIG. 8 is a sectional view of the capsule of FIG. 4 taken along the line B-B of FIG. 4.

Referring to FIGS. 7 and 8, a first type of capsule contains multiple straight, parallel, evenly spaced apart internal walls 12 which extend vertically or substantially vertically from the inside surface of the lower cone forming the capsule mid-way up the capsule, so that the walls terminate approximately in the plane of the base of the cone. By vertical or substantially vertical it is to be understood that the walls are formed in this orientation as the capsule is built in the AM machine. In the illustrated example there are some 18 walls each about 500 μm thick. As the walls terminate in substantially the same plane they are of different heights. Owing to the conical shape of the wall 9 of the capsule each internal wall 12 has the shape of an isosceles triangle. The height of the highest triangular wall is about forty times its thickness. The height of the shortest triangular wall is about three times its thickness. As a result the vast majority of the surface area of the inner walls is made up of vertical surfaces.

The walls 12 have a thickness less than ten times the width of the laser beam 7 which is typically about 70 μm. As such, the walls are classified as structure having a thin section.

The array of capsules 8 comprises multiple capsules of the same size of that shown in FIGS. 7 and 8 but with a similar internal structure having a different number of thin walls. Thus each capsule has substantially the same volume if the internal structure is ignored, but a different quantity of thin walled structure enclosed in the volume and thus a different melt ratio of powder within that volume. That is so to say, the proportion of the thin walled structure to the capsule volume varies between different capsule types.

Figure 9:
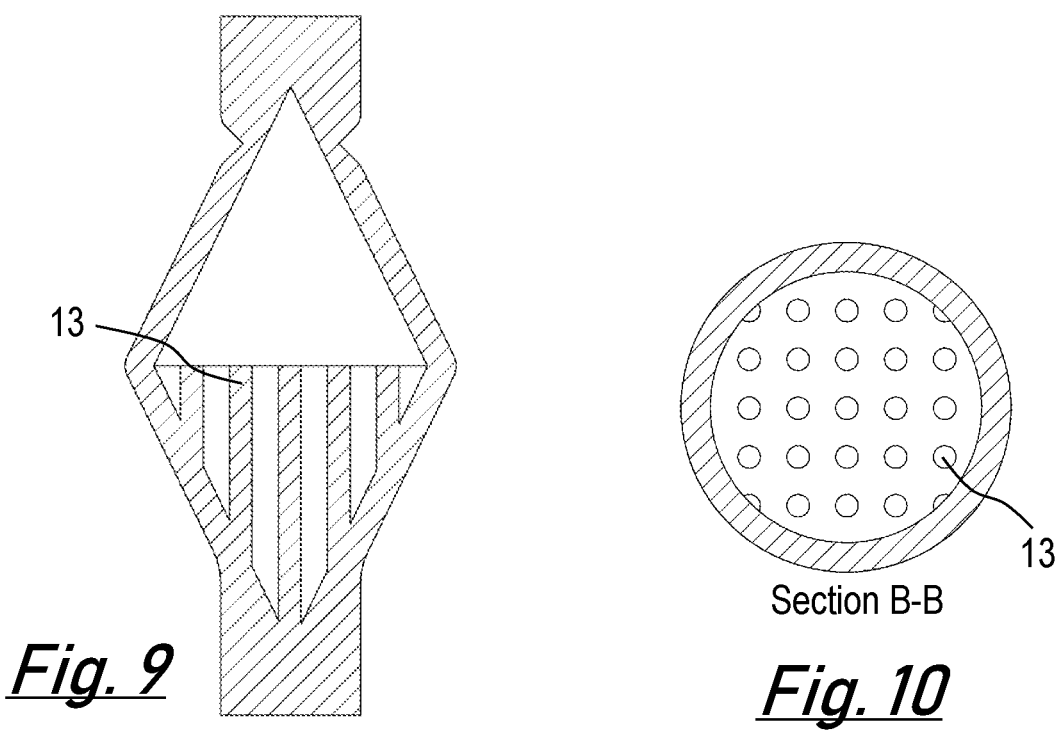
FIG. 9 is a sectional view corresponding to FIG. 7 of a different type of capsule having the same external appearance of the capsule of FIG. 4 but a different internal structure.
Figure 10:
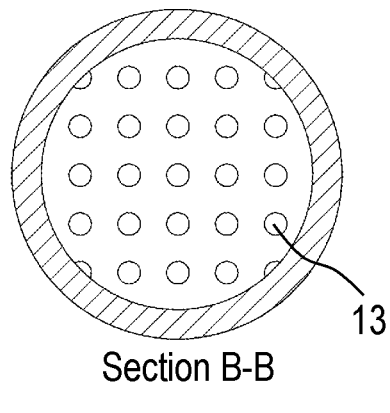
FIG. 10 is a sectional view corresponding to FIG. 8 of the capsule of FIG. 9.

Referring now to FIGS. 9 and 10, a second type of capsule contains multiple rods 13, mostly having a substantially circular section, being substantially straight and extending vertically or substantially vertically from the inside surface of the lower cone forming the capsule mid-way up the capsule, so that the rods terminate approximately in the plane of the base of the cone. By vertical or substantially vertical it is to be understood that the rods are formed in this orientation as the capsule is built in the AM machine. The rods are arranged in a regular rectangular array and in substantially straight, parallel, spaced apart rows and in each row the rods are evenly spaced apart by the same distance that the rows are spaced from each other. In the illustrated example the rods have a diameter of approximately 3.0 mm. The diameter of the rods 13 is thus significantly greater than ten times the laser beam width. The rods are therefore classified as structure having a thick section.

The array of capsules 8 comprises multiple capsules of the same size of that shown in FIGS. 9 and 10 but with a similar internal structure having a different number of rods having a different diameter such that, between capsules, the diameter of rods varies so that the ratio of the volume of the rods to the internal volume of the capsule remains is substantially the same, i.e. the melt ratio of powder within that volume is the same.

Figure 11:
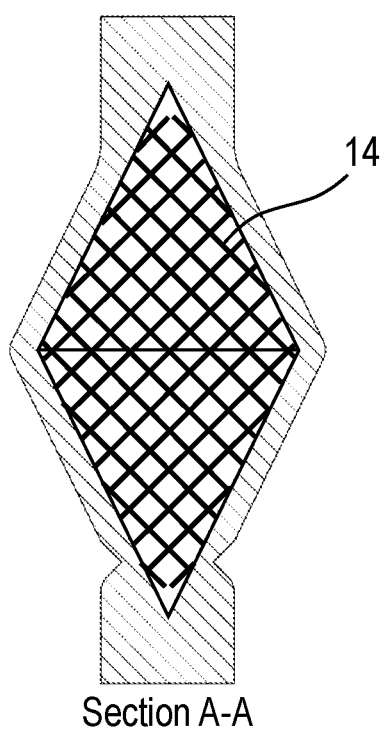
FIG. 11 is a sectional view corresponding to FIG. 7 of a further different type of capsule having the same external appearance of the capsule of FIG. 4 but a different internal structure.
Figure 12:
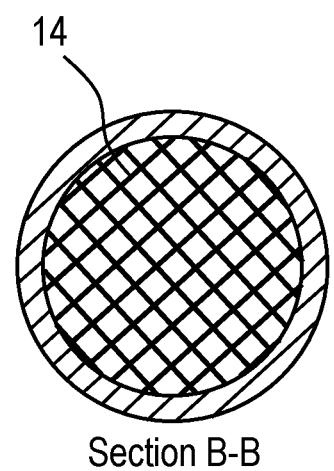
FIG. 12 is a sectional view corresponding to FIG. 8 of the capsule of FIG. 11.

Referring now to FIGS. 11 and 12, a third type of capsule contains a lattice structure 14 which substantially fills the capsule. The lattice is composed of interlaced strips of material. The thickness of the strips is significantly less than their width and is of the order or, or less than, the thickness of the internal walls 12 of the first type of capsule discussed above. No or substantially no part of the lattice extends vertically from an inside surface of the lower cone. As a result, the lattice presents multiple downward facing surfaces.

The array of capsules 8 comprises multiple capsules of the same size of that shown in FIGS. 11 and 12 but with a different lattice structure, such as one having fewer thicker strips or more thinner strips, such that, between capsules, the area of downward facing surface changes but the ratio of the volume of the lattice structure to the internal volume of the capsule is substantially the same, i.e. the melt ratio of powder within that volume is the same.

The array of capsules 8 contains an approximately equal number of each of three variants of each of the three illustrated types of capsule. That is, there are at least three capsules having different numbers of thin vertical walls, at least three capsules with different numbers of vertical rods of different thickness and at least three capsules with lattice having a different area of downwardly facing surface but approximately the same volume. The capsules are arranged so that each variant of each different type of capsule is distributed generally evenly throughout the array.

When the capsules have been built they are (optionally) removed from the build plate, opened, by removing a head 10, and the unfused powder contained within each capsule emptied out and analysed to determine the extent it has degraded as compared to virgin powder. Any suitable technique for analysing the amount of degradation of the powder may be used, such as, for a metal powder, measuring its bulk oxygen content to determine the extent of oxidation of the powder. The unfused powder contained in each capsule may be analysed separately and/or the unfused powder contained in each of any identical capsule combined together and analysed as a single sample. Where powder contained in each capsule is analysed separately the location of the capsule on the build plate may be recorded.

Analysis of the powder will thus reveal the type and/or extent of degradation of the powder as a result of construction of the different types of structures formed within each type of capsule. In particular by comparing the amount of degradation of powder recovered from different variants of capsules with the same general type of structure it is possible to infer the effect of the parameter or parameters that varies/vary between the variants on degradation. For example the varying parameter between variants of the type of capsule shown in FIGS. 9 and 10 is the quantity of thick wall structure. So the difference in the level of degradation in powder encapsulated in different variants of this type of capsule is indicative of the effect of the amount of thick section structure on the degradation rate of powder. Similarly, the difference in powder degradation between variants of the type of capsule shown in FIGS. 11 and 12 will reflect the effect of downward facing surfaces on degradation. With capsules of the type shown in FIGS. 7 and 8 both the quantity of thin section structure and melt ratio changes between variants, so to more accurately determine effect of changing the quantity of thin section structure a correction may be applied for the change in melt ratio. This analysis enables a relative degradation rate to be attributed to the three classes of structure contained in the capsules.

Figure 13:
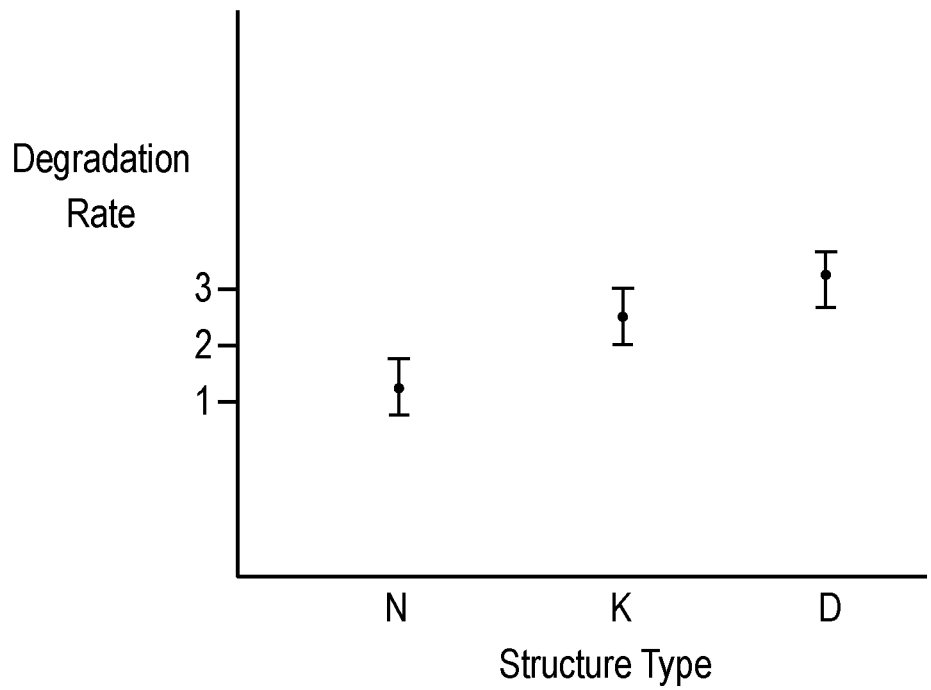
FIG. 13 is a chart plotting structural feature type against degradation rate.

FIG. 13 shows an example plot of degradation rate against structure type. The plot shows the mean degradation rate determined from all relevant capsules of each type with standard deviation from than mean as an error bar.

To increase reliability of the information one or more further sets of capsules may be constructed using powder from the same virgin batch of powder and a mean value for degradation of powder calculated using the results from all capsules of the same type constructed in different build operations.

Optionally one or more additional capsules having no internal structure could be constructed concurrently with the other capsules and the powder encapsulated in those capsules analysed too. This will effectively provide some control data against which the degradation of the powder in the structure containing capsules can be compared.

Analysis of the powder, by comparing degradation of powder from different capsules of the same type will also reveal the extent to which position on the build platform affects degradation of powder.

The information obtained may be used to predict how a powder will be degraded when used to build a given article.

This is achieved by analysing an article to be built to determine to characterise it by the amount, or relative amounts, of classes of structural features it comprises that correspond to those contained by types of capsules built to obtain powder degradation data. Then, using the information obtained on the extent to which each structural feature causes powder degradation, it is possible to calculate an overall value indicative of the expected total degradation of unfused powder when building the article.

This is useful in being able to estimate the likely usable life of powder when building the article in question. It may also help optimise the design of an article, or the orientation in which it is built since this will affect the classes of structural features it comprises because they are determined with reference to the build orientation of an article.

For example, an AM machine was used to construct an array of 27 capsules evenly distributed across its build plate using virgin powder. The array contained 3 capsules of each of three variants of the three types described above: a first type containing a structure having a greater quantity of thin sections than either of the other types; a second type containing a structure having a greater quantity of thick sections than either of the other types; and a third type containing a structure having a greater quantity of downward facing surfaces than either of the other types. In each case the quantity of the dominant structural feature type varied between each variant of each type of capsule.

Each capsule was the opened and unfused powder contained in the capsule emptied out and analysed to determine its bulk oxygen content. A mean value for bulk oxygen content for unfused powder contained in each variant of each type of capsule was the calculated. These values were then normalised against the measured bulk oxygen content of virgin powder, in order to determine relative powder degradation factors reflecting the relative degree of degradation caused by building each structure contained in each type of capsule. The differences in results for each variant of each type of capsule were then calculated and used to infer relative degradation rate of powder caused by building the different classes of structural features which predominate in each capsule.

Example data is shown in FIG. 13 which shows relative degradation rates for structures types as follows:

| Structure Type | Degradation Rate |
| --- | --- |
| Thin Section (N) | 1 |
| Thick Section (K) | 2 |
| Downward Facing Surface (D) | 3 |

This data was then used to estimate the degree of powder degradation caused to unfused powder when building an article. The structure of the article was analysed in its proposed build orientation to characterise its structure according to the relative proportions of classes of structural features for which a degradation rate had been obtained. Values for the proportions of each class of structure were determined, multiplied by the respective powder degradation factors determined by analysis of the unfused powder in the capsules, and combined to produce an overall value reflecting the likely degradation of unfused powder when building the article. This value may then be usefully compared with the same value calculated for different build orientations for the article and/or different articles and used to optimise a build to reduce degradation of unfused powder and/or to decide to what extent to re-use powder for a particular build operation.

Figure 14:
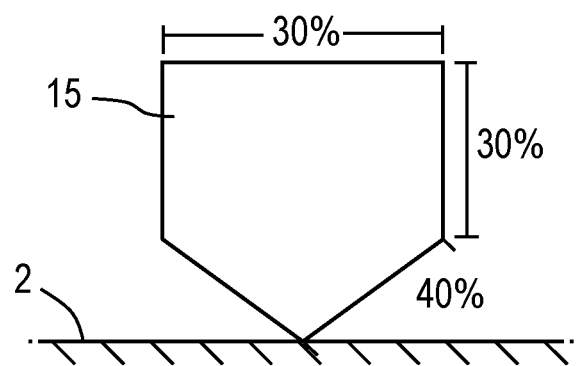
FIG. 14 shows a first article to be built on an AM machine.

An example article 15 is shown in FIG. 14. The structure of this article is analysed by looked at the proportions of its surface area that reflect classes structural feature of interest. In this case 40% of the surface area is downward facing. A downward facing surface can be classified as any unsupported downward facing surface irrespective of angle of orientation. 30% of its surface extends over a thick section, being of greater thickness than 10 beam widths. The remaining 30% of its surface is vertical walls (for which not degradation rate was obtained/or is applicable).

A general powder wear rate for the article can thus be computed by applying the degradation rates to the proportions of each class of structural feature as follows:

40%×3=1.2

30%×2=0.6

Total=1.8

Figure 15:
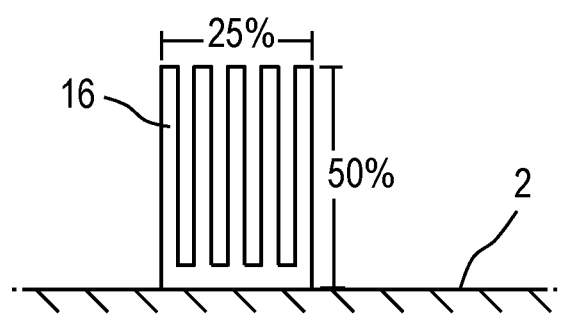
FIG. 15 shows a second article to be built on an AM machine.

Another example article 16 is shown in FIG. 15. This has the same melt ratio as that in FIG. 14 but a different shape. In this case 25% of the surface area extends over thin walls, the remainder being vertical walls. Thus, the general powder wear rate for this article is computed as follows:

25%×1=0.25

Total=0.25

So, building the second article is expected to result in significantly less degradation of powder than building the first, allowing powder to be recycled more times when building the second article than the first.

It will be appreciated of course that different types of capsules may be constructed for the analysis to other classes of structural feature than those discussed above.

The above embodiments are described by way of example only. Many variations are possible without departing from the scope of the invention as defined in the appended claims.

The invention claimed is:

1. A method of manufacture comprising a step of causing an AM machine to build a container and a structure in a build process by fusing powder, such that the container contains the structure and unfused powder, wherein the method comprises analysing the unfused powder in the container to determine an extent of degradation of the powder caused by the build process; and using the extent of degradation to predict powder degradation in another build process.

2. A method as claimed in claim 1 wherein the container is a capsule.

3. A method as claimed in claim 1 wherein the container comprises one or more sidewalls which diverge from each other as they rise from a base and subsequently converge towards one another towards a top.

4. A method as claimed in claim 3 wherein the container has a form of two opposed cones or pyramids.

5. A method as claimed in claim 1 wherein a line of weakness is formed in the container.

6. A method as claimed in claim 5 wherein the line of weakness comprises a region of reduced wall thickness.

7. A method as claimed in claim 1 wherein the container comprises a part shaped to be received by or connect to a tool or apparatus thereby to facilitate removing the container from a build plate and/or opening the container to release encapsulated powder.

8. A method as claimed in claim 7 wherein a respective part is provided at each opposite end of the container.

9. A method as claimed in claim 7 wherein the part is shaped to connect with a spanner, screw driver, key or wrench.

10. A method of manufacture as claimed in claim 1 wherein a plurality of containers are all manufactured during a single build, the plurality of containers comprising one or more types of container, each type of container containing a different type of structure.

11. A method as claimed in claim 1 wherein a plurality of containers are all manufactured during a single build, the plurality of containers comprising one or more type of container, each type of container containing a different type of structure and comprising a step of analysing unfused powder from each container separately to determine an extent of degradation caused by the build process, and using the extent of degradation of powder from at least some of the containers to predict powder degradation.

12. A method as claimed in claim 1 wherein unfused powder is analysed by measuring its bulk oxygen content to determine the extent of degradation of unfused powder caused by the build process.

13. A method as claimed in claim 1 wherein analysis of unfused powder from one or more containers is used to obtain information relating to a rate of degradation caused by building structures comprising or consisting of classes of structural features and to derive a degradation rate associated with building one or more classes of structural feature.

14. A method as claimed in claim 12 comprising characterising an article to be built in the other build process by determining a quantity or relative quantity of the classes of structural features for which a degradation rate has been obtained comprised in the article to be built and applying the degradation rates to these quantities thereby to predict the extent of powder degradation that will be caused by building the article.

15. A method as claimed in claim 13 wherein two different articles to be built are characterised so as to predict a relative powder degradation that will be caused by building the two articles.

16. A method as claimed in claim 13 wherein the article is characterised in two or more different build orientations so as to predict the powder degradation that will be caused by building the article in the different orientations.

17. A method as claimed in claim 1 wherein the container is closed and the method comprises a step of breaking open the/or each container to remove unfused powder.

18. A method as claimed in claim 1 wherein the container is a capsule and the method comprises a step of removing the capsule from the AM machine.

* * * * *